W. R. BAILARD.
TRACTOR.
APPLICATION FILED APR. 3, 1922.
1,435,910.
Patented Nov. 21, 1922.
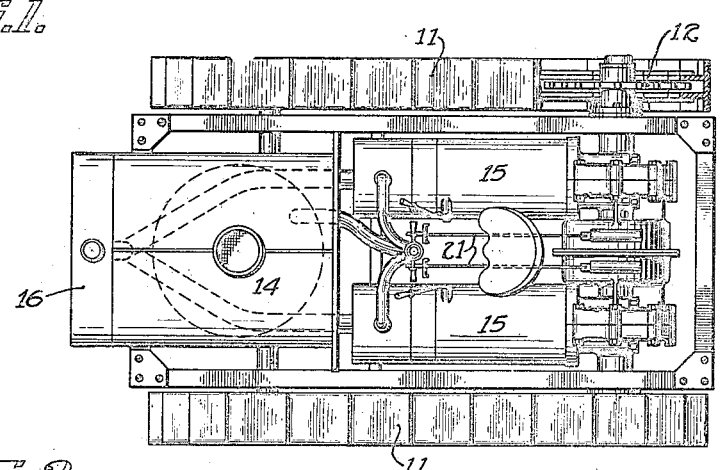
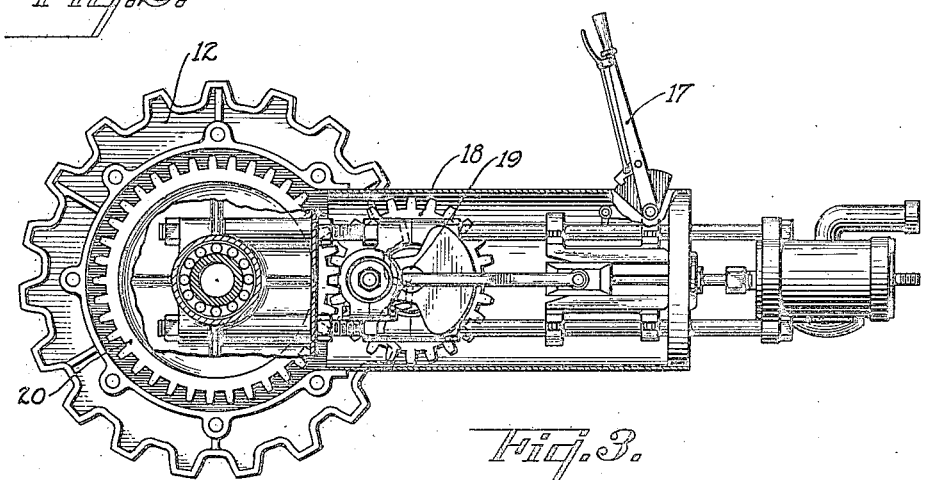
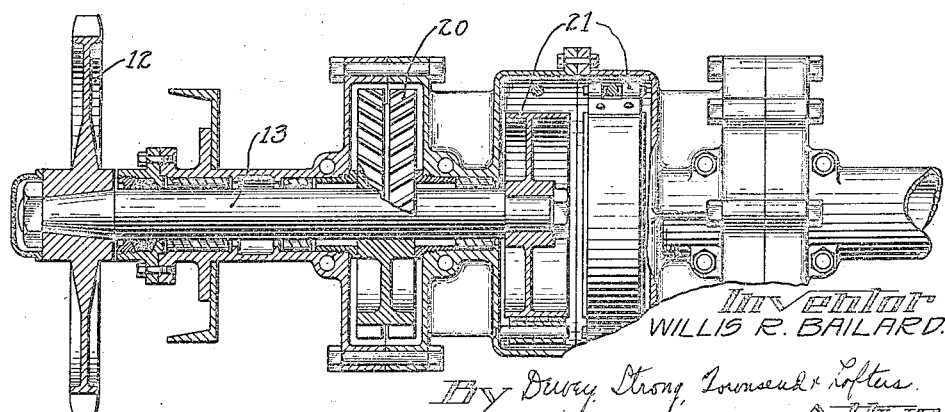
Inventor
WILLIS R. BAILARD.
By Dewey, Strong, Townsend & Lofters.
Att'ys Patented Nov. 21, 1922.

1,435,910

UNITED STATES PATENT OFFICE.

WILLIS R. BAILARD, OF BERKELEY, CALIFORNIA.

TRACTOR.

Application filed April 3, 1922. Serial No. 548,964.

*To all whom it may concern:*

Be it known that I, WILLIS R. BAILARD, a citizen of the United States, residing at Berkeley, county of Alameda, and State of California, have invented new and useful Improvements in Tractors, of which the following is a specification.

This invention relates to tractors of the self-laying track type wherein steering is accomplished by varying the speed of the respective track belts.

The object of this invention is to simplify a structure of this character by the elimination of the usual transmission gearing and steering mechanism. I accomplish this object by the use of two steam engines, one for each track, directly connected to the track driving sprocket wheel without the interposition of clutches or change-speed or reverse mechanism. The speed and direction of the tractor is controlled entirely through the throttles of the engines, each engine having its own throttle so that one engine may be operated faster or slower than the other, or driven forwardly or in a reverse direction without affecting the other.

One form which my invention may assume is exemplified in the following description and illustrated in the accompanying drawing, in which—

Fig. 1 shows a plan view of a tractor embodying my invention.

Fig. 2 shows a sectional view of one of the engines and its connections with the track driving sprocket wheel.

Fig. 3 shows a sectional view of a track driving sprocket wheel and its axle and associate mechanism.

The tractor shown herein comprises a frame 10 at each side of which is an endless self-laying track 11, each driven by a sprocket wheel 12 mounted upon an axle 13 carried upon the main frame, each axle being independent of the other. The power plant consists of a high efficiency water tube boiler 14 and two steam engines 15, preferably of the Stumpf type, uniflow, two-cylinder, double-acting condensation engine. The engines exhaust into a radiator type condenser 16 and the water is thus used over and over. These boilers and engines preferably are similar to those used in the modern steam automobile practice, and the fuel used is kerosene burned under a variable forced draft.

Each engine has its own individual throttle control 17 and is directly connected to the adjacent track by means of a spur gear 18 fixed upon the crank shaft 19 and meshing with a spur gear 20 fixed upon the axle 13 of the adjacent sprocket wheel.

Either track can be run forwardly or reverse independently of the other and the speed of each track can be independently controlled through the throttle of its respective engine. More power can be put in one track than the other to balance a load hitched to one side of the tractor, as is customarily done where it is desired to cultivate close to trees, etc. To assist in steering I may employ a brake mechanism 21 on each axle 13, the brakes being separately controlled. When one engine is thrown out of operation, the brake can be applied to prevent tracking of the track whereby to enable a short turn to be made without reversing one of the engines.

The advantages of a tractor of this type over prior tractors include simplicity of the final drive through the elimination of clutches and change speed and reverse gearing with the attendant advantages of a steam engine, such as large speed range and maximum torque at any speed.

Various changes in the construction and arrangement of the several parts herein shown and described may be employed without departing from the spirit of my invention as disclosed in the appended claims.

Having thus described my invention, what I claim and desire to secure by Letters Patent is:

1. In combination with a tractor having a main frame with an endless self-laying track disposed at each side thereof, each track having a separate driving engine with a separate control, of a rear axle and transmission mechanism for said tractor comprising aligned independent rear axles journaled in the frame, one for each track, the said axles each carrying a driving sprocket at their outer ends for driving said tracks, a gear secured on each axle, a gear secured on the crank shaft of each engine in mesh with said gears for driving the axles, and a brake drum and its band secured on the inner end of each axle, said brakes having separate controlling means.

2. A tractor comprising a main frame, front axles carried by the frame, a pair of aligned independent rear axles carried by the frame, sprocket wheels mounted at the outer end of the axles and carrying endless self-laying tracks at each side of the frame, a gear secured to each rear axle, an engine for each track and its rear axle, the said engines each having a gear on its crank shaft in mesh with the gear on the adjacent rear axle, a separate throttle control for each engine whereby the tractor may be driven forwardly or reverse at various speeds and the speed of one track varied with respect to the other for steering purposes, a brake drum and its band mounted on the inner end of each of the rear axles, and separate operable means for controlling said brakes to aid in steering or controlling the tractor.

WILLIS R. BAILARD.